(12) United States Patent
Sümmermann

(10) Patent No.: US 11,987,488 B2
(45) Date of Patent: May 21, 2024

(54) MODULE CONNECTOR, MODULE CONTAINER, AND SEALING ELEMENT THEREFOR

(71) Applicant: Volkmann GmbH, Soest (DE)

(72) Inventor: Konrad Sümmermann, Wilmington, DE (US)

(73) Assignee: VOLKMANN GMBH, Soest (DE)

( * ) Notice: Subject to any disclaimer, the term of this patent is extended or adjusted under 35 U.S.C. 154(b) by 715 days.

(21) Appl. No.: 17/099,981

(22) Filed: Nov. 17, 2020

(65) Prior Publication Data

US 2021/0147213 A1 May 20, 2021

(51) Int. Cl.
*B67D 3/00* (2006.01)
*B65G 65/44* (2006.01)
*F16L 29/02* (2006.01)
*F16L 37/28* (2006.01)

(52) U.S. Cl.
CPC ........... *B67D 3/0041* (2013.01); *B65G 65/44* (2013.01); *B67D 3/0025* (2013.01); *F16L 29/02* (2013.01); *F16L 37/28* (2013.01)

(58) Field of Classification Search
CPC ..... B67D 3/0025; B67D 3/0041; F16L 29/02; F16L 37/28; B65G 65/44
See application file for complete search history.

(56) References Cited

U.S. PATENT DOCUMENTS

| | | | | |
|---|---|---|---|---|
| 4,903,741 | A * | 2/1990 | Ibanez | B67C 3/065 141/46 |
| 5,758,700 | A * | 6/1998 | Vanderploeg | B67D 1/0835 99/323.1 |
| 5,796,419 | A * | 8/1998 | Clark | B41J 2/175 347/85 |
| 6,079,444 | A * | 6/2000 | Harris | F16L 37/32 251/149 |
| 6,296,152 | B1 * | 10/2001 | Semenenko | B65D 88/28 222/507 |
| 6,691,978 | B1 * | 2/2004 | Bartos | F16L 29/02 251/149.6 |
| 7,849,892 | B1 * | 12/2010 | Connors | B65D 19/0026 141/351 |
| 10,330,232 | B2 * | 6/2019 | Wong | F16L 21/03 |

* cited by examiner

*Primary Examiner* — Timothy L Maust
(74) *Attorney, Agent, or Firm* — UB Greensfelder LLP; Brian E. Turung

(57) ABSTRACT

A docking device for mechanically connecting an upper and a lower container module of a multipart container. The docking device includes an upper docking segment which is fastenable on an opening of the upper container module, and a lower docking segment which is fastenable on an opening of the lower container module. Fluid is configured to move from the upper container module into the lower container module. An upper docking region of an upper channel section and/or an upper docking segment and a lower docking region of a lower channel section and/or the lower docking segment can be arranged in such a way that the fluid flows through an externally leak-tight channel in an open valve body position. An actuating assembly is arranged in the upper channel section and/or in the lower channel section.

27 Claims, 11 Drawing Sheets

G / 2 : 1

E / 1 : 1

MODULE CONNECTOR, MODULE CONTAINER, AND SEALING ELEMENT THEREFOR

AREA OF THE INVENTION

The invention relates to a docking device and a device for interrupting a flow of a fluid, in particular a valve device. The docking device is for mechanically connecting, namely for docking and undocking, an upper container module of a multipart container for a fluid and a lower container module of the multipart container. The docking device includes an upper docking segment, which is fastenable using an upper connecting means on an opening of the upper container module, and a lower docking segment, which is fastenable using a lower connecting means on an opening of the lower container module. The fluid moves through the docking device due to gravity and/or pressure from the upper container module through a channel of the docking device into the lower container module, or moves due to buoyancy and/or pressure from the lower into the upper container module, if at least one valve body, which is movable by means of an actuating assembly arranged in the user and/or in the lower docking element in the channel of the docking device, is in an open valve body position. An upper channel section is arranged in the upper docking segment and a lower channel section is arranged in the lower docking segment. An upper docking region of the upper channel section and/or the upper docking segment and a lower docking region of the lower channel section and/or the lower docking segment can be arranged one inside the other and/or one on top of another, in particular by form fit and/or friction lock, fluid-tight in such a way that the fluid flows through the externally leak-tight channel in the open valve body position. An actuating assembly is arranged in the upper channel section and/or in the lower channel section, using which the valve body is actuatable so that it is movable from an open valve body position into a closed valve body position or from a closed valve body position into an open valve body position. The device for interrupting a flow of a fluid, in particular a valve device, has an upper and a lower docking segment for docking and undocking an upper container module of a multipart container for a fluid and a lower container module of the multipart container. The upper docking segment is fastenable using an upper connecting means on an opening of the user container module, and the lower docking segment is fastenable using a lower connecting means on an opening of the lower container module. The fluid moves through the docking device due to gravity and/or pressure from the upper container module through a channel of the docking device into the lower container module or moves due to buoyancy and/or pressure from the lower into the upper container module, if at least one valve body, which is movable by means of an actuating assembly arranged in the upper and/or in the lower docking element in the channel of the docking device is in an open valve body position. An upper channel section is arranged in the upper docking segment and a lower channel section is arranged in the lower docking segment. An upper docking region of the upper channel section and/or the upper docking segment and a lower docking region of the lower channel section and/or the lower docking segment can be arranged one inside the other and/or one on top of another, in particular by form fit and/or friction lock, fluid-tight in such a way that the fluid flows through the externally leak-tight channel in the open valve body position. An actuating assembly is arranged in the upper channel section and/or in the lower channel section, using which the valve body is actuatable so that it is movable from an open valve body position into a closed valve body position or from a closed valve body position into an open valve body position. Accordingly, an upper and a lower docking segment are provided, both for docking and undocking from an upper container module of a multipart container for a fluid and a lower container module of the multipart container. The docking device is used for the mechanical connection, namely for docking and undocking, from an upper container module of a multipart container for a fluid and a lower container module of the multipart container. The valve device is used for interrupting a flow of the fluid. A fluid is a flowable material, i.e. a material having a finite viscosity, or a flowable material mixture, for example a (viscous) liquid material/mixture, a powder, a dust, a granulated or chunky material/mixture, or a (non-cohesive or cohesive) bulk material or a gas.

The docking device or the valve device, respectively, comprises an upper docking segment, which is fastenable using an upper connecting means on opening of the upper container module, and a lower docking segment, which is fastenable using a lower connecting means on opening of the lower container module. The connecting means can be formed as a (detachable) mechanical flange or can comprise a (permanent) adhesive bond or welded bond. The fluid moves due to gravity and/or due to pressure from the upper container through a channel of the docking device for the valve device into the lower container if a valve body, which is movable by means of an actuating assembly arranged in the upper or in the lower docking element, is in an open valve body position in the channel of the device. The pressure-related flow direction of the fluid can be determinable by application of a pressure, in particular differential pressures. It can also be provided that the fluid moves due to buoyancy and/or due to pressure from the lower into the upper container. An upper channel section is arranged in the upper docking segment and a lower channel section is arranged in the lower docking segment.

An upper docking region of the upper channel section and/or the upper docking segment and a lower docking region of the lower channel section and/or the lower docking segment are arrangeable in one another and/or on one another in a fluid-tight manner, in particular by form fit and/or friction lock, so that the fluid flows through the channel, which is externally leak-tight, in the open valve body position. Externally leak-tight means here leak-tight in relation to the surroundings of the described device, so that the fluid moves from the upper container module into the lower container module, but not into the surroundings of container and docking device. An actuating assembly is arranged in the upper channel section and/or the lower channel section, using which, inter alia, the valve body is actuatable so that it is movable from an open valve body position into a closed valve body position or from a closed valve body position into an open valve body position. The movement of the valve body is carried out, for example, by displacement, for example in a linear guide, or by rotation, for example by a screwing movement having corresponding thread guide.

The invention also relates to a metering device for metering the flow of a fluid from an upper container module of a container into a lower container module of the container, or from a lower container module into an upper container module.

The invention additionally relates to a container for fluid. Accordingly, the container comprises at least one container module, in particular an upper and a lower container module.

TECHNOLOGICAL BACKGROUND

For bulk materials, in particular for powders, a bulk material supply is to be provided regularly to a bulk material handling system. If the bulk material supply is consumed, new bulk material has to be provided. This is carried out using bulk material containers which are docked on handling containers for the bulk material handling using valve devices. The docking and undocking is to take place securely, on the one hand, i.e. no leaks or faults are to occur during the docking/undocking. Moreover, no or as little as possible bulk material is to move into the surroundings of the container or the container modules during the docking/undocking.

DESCRIPTION OF THE INVENTION

The invention is based on the object of specifying measures, using which the most simple and secure possible handling of a bulk material container (module) connection takes place, wherein as little container content (bulk material) as possible is to move into the container surroundings. This object is achieved by a docking device. Advantageous designs of the docking device result from the dependent claims. The docking device is accordingly characterized in that the actuating assembly comprises at least one blocking assembly comprising a blocking means, wherein upper and lower docking segment are stably connectable, in particular lockable, with one another, in that the blocking means moves into a blocking position. During the docking process, upon actuation of the actuating assembly, first the blocking means is actuatable and then the valve body. During the undocking process, upon actuation of the actuating assembly, first the valve body is actuatable and then the blocking means. During the docking, locking first takes place, then opening, during the undocking, closing first takes place, then the locking is released. Opening without locking is not possible, since the actuating assembly comprises a failsafe function which blocks a movement of the valve body without locking. During the docking, an actuating pin of the actuating assembly is moved downward, for example, in the first movement section during the downward movement it is locked, in the second movement section during the downward movement subsequent thereto, the valve is opened in the upper docking element if the blocking or locking process was previously mechanically correctly ended. During the undocking, the actuating pin moves in the opposite direction, i.e. upward, so that in the first movement section of the upward movement the valve is closed and in the second movement section of the upward movement subsequent thereto, the locking is released. In this way, it is guaranteed that the valve is only opened when the locking element has reached the blocking position, i.e. after the locking.

A measure for the most simple and secure possible handling of a bulk material container (module) connection, wherein as little container content (bulk material) as possible is to move into the container surroundings, also results due to a (valve) device for interrupting a flow of a fluid. The valve device comprises an upper and a lower docking element for docking and undocking from an upper container module of a multipart container for a fluid and a lower container module of the multipart container. In the (valve) device it is provided that the actuating assembly comprises at least one blocking assembly comprising at least one blocking means, wherein upper and lower docking segment are stably connectable, in particular lockable with one another in that the blocking means moves into a blocking position, wherein during the docking process, upon actuation of the actuating assembly, first the blocking means is actuatable and subsequently the valve body, and during the undocking process, upon actuation of the actuating assembly, first the valve body is actuatable and subsequently the blocking means. The channel an have a circular cross section, in particular an annular cross section at least in sections, wherein the circle symmetry and/or ring symmetry of the channel comprises a channel axis of symmetry. The core element can be arranged in the channel, in particular along the channel axis of symmetry, in which the actuating assembly and/or the blocking assembly is/are arranged, in particular at least partially movably. The actuating pin of the actuating assembly can be movable in parallel to or along the channel axis of symmetry, and in that the blocking means of the blocking assembly is movable in the radial direction, wherein preferably the actuating assembly comprises an actuating pin for manipulating the valve body, which comprises a first inclined surface, against which the blocking means of the blocking assembly presses, so that upon an axial movement of the actuating pin, the blocking means is movable with radial directional component. The at least one blocking means can be formed as a sphere or as a barrel or as a wedge or as a pin, and in that the blocking means is movable into a blocking recess during the docking, wherein the blocking means is arranged in the lower docking segment and the blocking recess is arranged in upper docking segment, or the blocking means is arranged in the upper docking segment and the blocking recess is arranged in the lower docking segment. The valve body can be conical at least in sections, and/or in that the valve body is movable out of the closed position into the open position against the action of at least one valve body spring, and/or in that the valve body is formed in multiple parts, in particular two parts. The upper docking segment and/or the lower docking segment can comprise a segment sealing surface, which is in contact with at least one valve body sealing surface in the closed valve body position, wherein preferably the segment sealing surface and the valve body sealing surface are annular, and/or wherein preferably at least one, in particular one in each case, seal element is arranged in or on the segment sealing surface and/or in or on the valve body sealing surface, and/or wherein preferably at least one seal element can have a sealing force applied to it to form a seal by the action of a valve body spring. At least one docking seal element, in particular one docking seal element in each case, can be arranged in or on the upper docking regio and/or in or on the lower docking region. A movement of the valve body into the open valve body position by the actuating assembly can only takes place if the blocking means of the blocking assembly is in the blocking position, wherein preferably the actuating assembly is actuatable mechanically, hydraulically, and/or pneumatically. The actuating assembly and/or the actuating pin can comprise an action surface, which is inclined and/or conical in particular, and via which a force and/or a torque is transferable to the actuating assembly and/or the actuating pin. The actuating assembly and/or the actuating pin can be actuatable against the action of a restoring spring, and/or in that the actuating assembly is actuatable magnetically, in particular electromagnetically. The valve body can be formed in two parts, wherein an upper valve body part is arranged in the upper docking segment and a lower valve body part is arranged in the lower docking segment. A securing element, which is movable, in particular in the axial or longitudinal direction, can be arranged in or on the upper and/or lower docking element, whereby the docking elements of the docking device can be mechanically secured against opening in the respective closed valve body position. A position or location detection means can be arranged on the upper and/or lower docking element, whereby the position or location, in particular the end position or end location, of the upper/lower docking element in relation to the lower/upper docking element is detectable, in particular mechanically, pneumatically, electrically, electronically, electromagnetically, and/or electro-optically. At least one pressure-compensating means can be provided, using which a partial or complete pressure compensation van be produced between upper container module and lower container module, in particular during and/or after a fluid movement, wherein the pressure-compensating means is preferably formed as a channel (bypass) between upper and lower channel section. The docking device can comprise at least one surge-gassing means and/or pressure-gassing means, using which a gas flow can be applied, in particular in surges, to at least one device component, in particular an upper/lower seal, to clean the component against which flow occurs. At least one vibration means can be arranged in or on the upper and/or lower valve body part, whereby at least a, in particular mechanical, vibration can be applied to the upper and/or lower valve body part.

It can be expedient if the channel has a circular cross section, in particular has an annular cross section at least in sections, wherein the circular symmetry and/or ring symmetry of the channel comprises a channel axis of symmetry. A core element is preferably arranged in the channel, in particular along the channel axis of symmetry, in which the actuating assembly and/or the blocking assembly is/are arranged, in particular at least partially movably. The core element can be fastened via at least one web, preferably via multiple webs distributed essentially uniformly around the circumference of the channel, on the channel inner wall. If the actuating assembly comprises at least one actuating pin, it can be moved in parallel to or along the channel axis of symmetry. The blocking means of the blocking assembly is expediently movable in the radial direction. A stable engagement of the blocking means thus takes place in a recess provided for this purpose or in a cavity provided for this purpose in the device. The movement of the locking means can comprise a radial movement component, i.e. a movement component which extends perpendicularly to the movement direction of the docking device or valve device, respectively, during the docking or undocking.

The actuating assembly can comprise an actuating pin for manipulating the valve body, which comprises a first inclined surface, against which the blocking means of the blocking assembly presses, so that during an axial movement of the actuating pin, the blocking means is movable with a radial directional component. During an axial or longitudinal movement of the actuating pin, the blocking means is moved by the inclined surface provided for this purpose radially or perpendicularly to the movement direction of the actuating pin out of a neutral position into a blocking position. This takes place in particular if the docking elements are correctly seated in or on one another and if blocking means and blocking means recess are arranged adjacent to one another.

The at least one blocking means can be formed as a ball or as a barrel or as a wedge or as a pin, wherein the blocking means is movable into a blocking recess upon docking. The blocking recess can be formed as a pocket or hole or cavity. The blocking means can be arranged in the lower docking segment and the blocking recess can be arranged in the upper docking segment. Alternatively, the blocking means can be arranged in the upper docking segment and the blocking recess can be arranged in the lower docking segment. A blocking arrangement can also be provided in which blocking means of blocking recess are each provided in upper and lower docking segment.

With respect to homogeneous flow behavior of the bulk material, it can be provided that the valve body is formed to be conical at least in sections. The valve body can be movable against the action of at least one valve body spring out of the closed position into the open position. I.e. in the docked state, the valve body can be opened against the action of the valve body spring and when the device is to be docked, a reset of the valve body into the closed position is assisted by the action of the valve body spring. Due to the action of the valve body spring, the valve body remains in its closed position in the undocked state. The valve body spring accordingly contributes to the channel section associated with the valve body being closed. During the movement of the valve body to open the channel, the spring force of the valve body spring first has to be overcome. The valve body can additionally be formed in multiple parts, for example two parts. The valve body can thus comprise an upper valve body part and a lower valve body part. A valve body spring can be associated with each valve body part.

With respect to docking and undocking as much as possible without contaminating the surroundings of the device according to the invention, it can be provided that the upper docking segment and/or the lower docking segment comprises a segment sealing surface, which is in contact with at least one valve body sealing surface in the closed valve body position. The sealing surfaces can each be formed to be annular. The sealing surface sections accessible on the surface of the docked segments can be comparatively small due to the ring and cone geometry of the components of the device, for example in the order of magnitude of a ring surface based on a ring width of approximately 1 mm or less than approximately 1 mm, in particular at channel diameters of greater than approximately 20 cm, based on a ring width of a few millimeters, in particular less than approximately 3 mm. Due to the low ring width of the externally accessible sealing surface sections, a probability of contamination of the surroundings of the device is also reduced, as well as the probability that contaminants will move via the seal assembly into the interior of the device and thus into the interior of the container modules. The bulk material handling thus becomes significantly safer and cleaner.

The segment sealing surface and the valve body sealing surface can be formed to be annular, wherein at least one, in particular one in each case, seal element is arranged in or on the segment sealing surface and/or in or on the valve body sealing surface. A sealing force can be applied to the seal element by the action of a (valve body) spring to form a seal. A seal ring having round or oval cross section (O-ring) or having polygonal (rectangular) cross section comes into consideration as a seal element. The seal ring can be formed from an elastic material and is thus elastically deformable during the docking.

During the undocking, the seal ring returns to its original shape. With regard to maintenance aspects, it can be expedient if the seal assembly is constructed so that one seal element of one segment is contacted with one seal element of the other segment in the docked state. At least one docking seal element, in particular one docking seal element in each case, can be arranged in or on the upper docking region and/or in or on the lower docking region. At least one seal element can be arranged so that it is both valve body seal element and also docking seal element. I.e. it seals—depending on the position of the actuating pin—between the docking regions of the segments and/or between channel and valve body.

In order that bulk material does not move into the surroundings in the open valve body position, a movement of the valve body into the open valve body position by the actuating assembly is preferably only possible if the blocking means of the blocking assembly is in the blocking position. The blocking position is the position in which the blocking means is positioned in the corresponding blocking recess. If the blocking means does not move into the blocking position, for example upon incorrect use of the device or upon use of the device not as intended, a movement of the valve body out of the closed position is not possible insofar as the blocking engagement of the blocking means required for this purpose is absent. The device thus comprises a failover or a failsafe function. Failsafe function and locking function run simultaneously.

The actuating assembly can be actuatable mechanically, hydraulically, and/or pneumatically. An externally accessible lever can be provided for this purpose, which can be operated manually or via a servomotor. If linear movement of the actuating pin is not provided, but a screw movement, a mechanical rotational feedthrough to the outside can be provided. A movement of the actuating pin can also be carried out via a hydraulic or pneumatic (over-) pressure or by (electro-) magnetism. For this purpose, an externally accessible connecting means for an external pressure line can be provided and also an internal pressure line. The actuating assembly and/or the actuating pin can comprise an action surface, which is inclined and/or conical in particular, via which a force and/or a torque is transferable to the actuating assembly and/or the actuating pin.

In order that a reset of the components of the actuating assembly takes place during the docking and/or undocking, it can be provided that the actuating assembly and/or the actuating pin is/are actuatable against the action of a restoring spring. The actuating assembly can furthermore be actuatable magnetically, in particular electromagnetically.

In order that both container modules are closable leak-tight in the docked state of the device, it can be expedient if the valve body is formed in two parts, wherein an upper valve body part is arranged in the upper docking segment and a lower valve body part is arranged in the lower docking segment. Each valve body part can be movable out of its closed position against the action of a spring. A movement of the valve body parts to open the channel takes place simultaneously in that both valve body parts are coupled to one another by means of actuating and blocking assembly. Decoupling of the valve body parts is carried out by unblocking of the blocking assembly, wherein this only succeeds in the closed valve body position. At least one seal element can have a sealing force applied to it to form a seal by the action of a valve body spring. I.e., the valve body spring which applies a spring force to the valve body can contribute to the seal being squeezed in the sealing state, so that the sealing action of the seal is reinforced by the valve body spring.

It can be provided that a securing element, which is movable, in particular in the axial or longitudinal direction, is arranged in or on the upper and/or lower docking element, whereby the docking elements of the device are mechanically securable against opening in each closed valve body position. Opening of at least one of the channel sections is to be prevented by the securing, namely when the channel sections are not docked on one another. Fluid is thus to be prevented from escaping from one of the container modules connected to the device in the separated state of the device. The securing element can have the action of a lock, using which the valve body is lockable.

If a position or location detection means is arranged on the upper and/or lower docking element, the position or location, in particular the end position or end location, of the upper/lower docking element in relation to the lower/upper docking element is detectable, in particular mechanically, pneumatically, electrically, electronically, electromagnetically, and/or electro-optically. Using the end location detection, it is detectable whether a docking element has reached its desired end location during docking. A confirmation of the end location could be translated into a signal or into an action, so that the fluid connection is recognized as open, locked, and thus functionally enabled. The position or location detection means can be formed as a movable pin or cam, which releases a pressure channel or a switching contact, for example, if the intended end location of the upper/lower docking element or the valve body, respectively, is reached. If a pressure channel is released, which results in a pneumatic signal, a pressure switch can be actuated via the involved lines/channels, which reproduces the location detection signal. It is displayed by the position or location detection that both the docking and also the valve opening function trouble-free, so that a fluid movement can take place securely and without leakage. A movement of the position or location detection means can take place in that, for example, one of the valve bodies mechanically contacts the location detection means during its movement and then also moves it. In that the location detection means is moved or pivoted and/or displaced from a position "any location" into a position "end location", the corresponding location detection signal is triggered. As soon as the location detection signal indicates that the desired end location is reached, the user knows that a trouble-free fluid movement will now take place.

At least one pressure-compensating means can preferably be provided, using which a partial or complete pressure compensation can be produced between upper container module and lower container module, in particular during and/or after a fluid movement. The pressure-compensating means can be formed as a channel (bypass) between upper and lower channel section. A pressure difference, which can form between the container modules when fluid moves from one into the other container, is dissipated using the pressure-compensating means. In that one of the container modules empties, internal pressure is reduced therein, wherein a pressure increase forms simultaneously in the filling container module. The difference between pressure increase and pressure reduction remains as a pressure difference, which can be dissipated using the pressure-compensating means, in the region of the device.

With respect to cleaning measures or a cleaning method, respectively, it can be expedient if the device comprises at least one surge-gassing means and/or pressure-gassing means, using which a gas flow, in particular in surges, can be applied to at least one device component, in particular an upper/lower seal, to clean the component against which it flows. The surge-gassing and/or pressure-gassing means is used to remove fluid residues before, during, or after the docking, in particular to improve the scaling action of the device and/or to extend the service life of the device components. At least one vibration means can be arranged in or on the upper and/or lower valve body, whereby at least one oscillation, which is mechanical in particular, can be applied to the upper and/or lower valve body part. A flow improvement of the fluid is achieved by the vibration.

A measure for the most simple and secure possible handling of a bulk material container (module) connection, wherein as little container content (bulk material) as possible is to move into the container surroundings, finally results by way of a metering device. The metering device is used for metering the flow of a fluid from an upper (lower) container module into a lower (upper) container module of the container. The metering device comprises a docking device described herein or a valve device described herein. A control and/or regulating assembly is provided, which controls and/or regulates the valve body position of a (one-part or multipart) valve body. Using the metering device, the valve body position can be changed without changing the locking of the docking segments, i.e., the docking segments remain locked during the metering process. In addition to the valve body positions "open" (maximum fluid flow) and "closed" (no flow), further valve body positions can be provided, in which the valve body is moved into a position between "closed" and "open". A flow of the fluid is thus adjustable, namely between the extreme values relating to the maximum flow and no flow, for example "moderate flow" or "high flow" or further flow settings.

In order that the flow through the channel of the device remains as constant as possible, in particular can be metered constantly, even with bulk material having inhomogeneous flow behavior, a flow homogenization means can be provided, such as a vibration device for applying at least one oscillation, which is in particular mechanical and is at least partially transferable to the fluid, to at least one component of the device. The vibration device can thus apply a mechanical oscillation excitation, for example linear or circular, to the device described herein. The formation of local bulk material clumps or chunks or bridges or formations and the adhesion of bulk material on and/or in the channel are thus reduced and the effective bulk material flow is more homogeneous.

One measure for the most simple and secure possible handling of a container (module) connection, wherein as little container content (bulk material) as possible is to move into the container surroundings, additionally results by way of a container. The container comprises a docking device described herein and/or a valve device described herein, and/or a metering device described herein. If only one container module is provided, the device is used as a valve device for emptying device having an additional security feature, in which the passive docking element fulfills a key function for the active docking segment.

The above-mentioned components and the components to be used according to the invention as claimed and described in the exemplary embodiments are not subject to special exceptions in their size, shaping, material selection, and technical conception, so that the selection criteria known in the area of application can be applied unrestrictedly.

Further details, features, and advantages of the subject matter of the invention result from the dependent claims, and from the following description and the associated drawing, in which—by way of example—an exemplary embodiment of a docking device or valve device is shown. Individual features of the claims or the embodiments can also be combined with other features of other claims and embodiments.

DETAILED DESCRIPTION OF EXEMPLARY EMBODIMENTS

Figure 1:
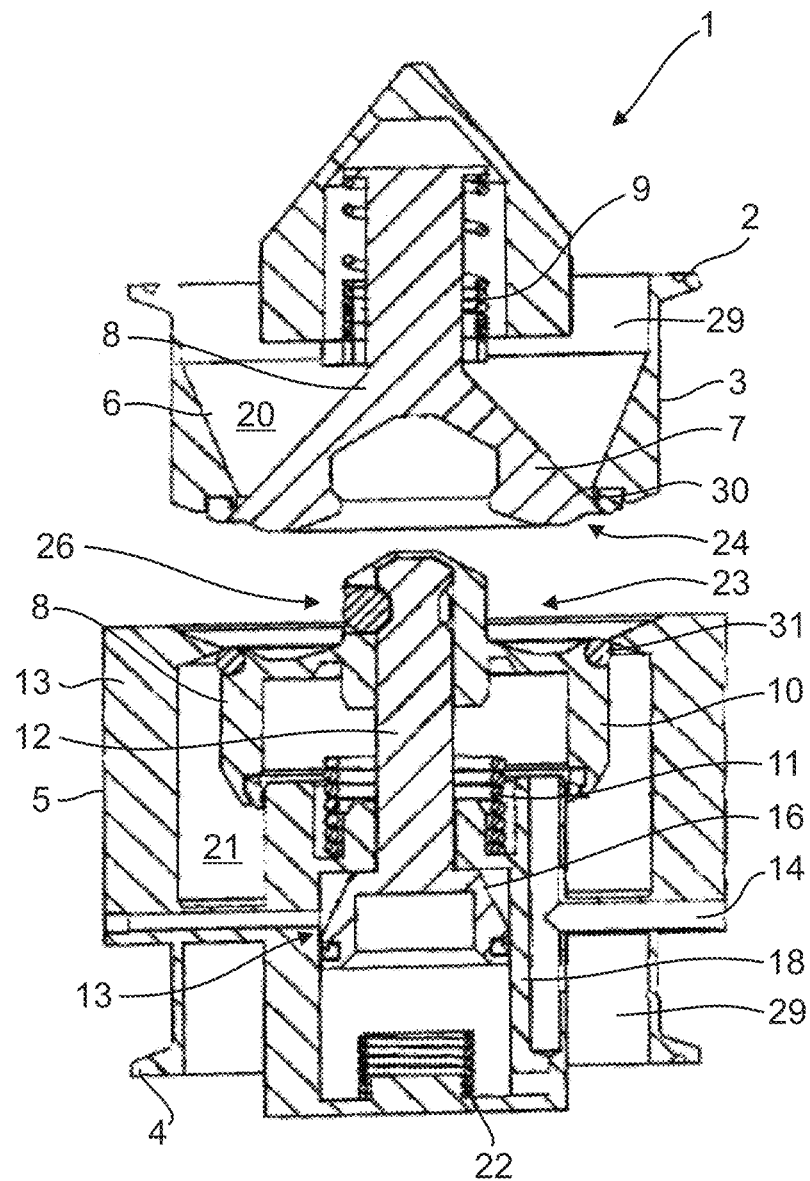
FIGS. 1-5 show a docking device or valve device, respectively, in various views.

FIGS. 1 to 12 show different views of multiple variants of a device 1, which is either a docking device 1 according to the invention or a valve device 1 according to the invention. FIG. 1 shows a sectional view of a docking device 1. The device 1 is used for docking and undocking and fluidically connecting to container modules, which are each not shown in the figures. An opening of the upper container module can be connected to the upper flange 2 of the upper docking segment 3. An opening of the lower container module can be connected to the lower flange 4 of the lower docking segment 5.

The device 1 comprises a channel 6, through which the material located in the container can move from one into the other container module. In the case of bulk goods, the material moves from the upper into the lower container, in the case of a rising gas, from the lower into the upper container.

According to FIG. 1, an arrangement is shown in a sectional view, wherein upper docking segment 3 and lower docking segment 5 are spatially separated from one another. This arrangement corresponds to the situation immediately before the beginning of the docking process. A conical upper valve body part 7 of a two-part valve body 8 is arranged in the upper docking segment 3, which is movable downward, i.e., in the direction of the lower docking segment 5, against the action of the upper valve body spring 9.

The lower valve body part 10 of the two-part valve body 8 is arranged in the lower docking segment 5, which is movable against the action of the lower valve body spring 11. Moreover, an actuating pin 12 of an actuating assembly 13 is arranged in the lower docking segment 5, which is also movable downward, for example by means of lever force or pneumatic or hydraulic action, respectively.

If pneumatics are to be provided for actuating the actuating assembly 13, a line 15 can be connected to an attachment means 14, whereby a force or a pressure can be applied to an action surface 16 of the actuating assembly 13 formed as a second inclined surface. The actuating assembly additionally comprises a restoring spring 22.

Figure 2:
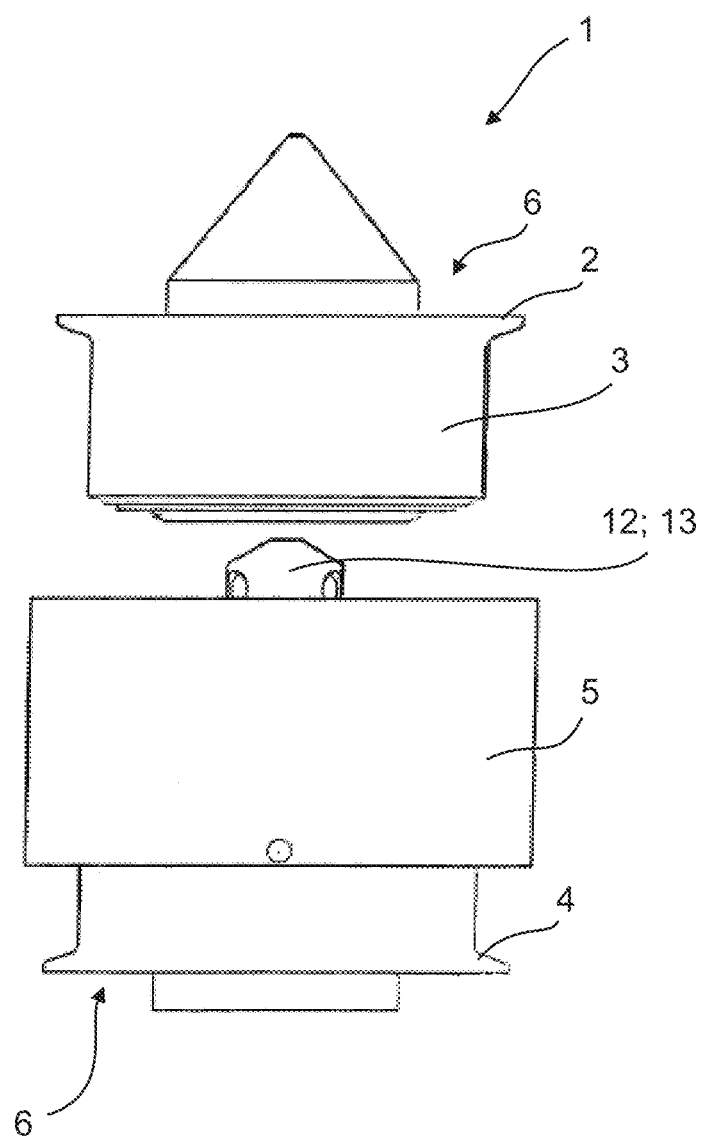

A lateral view of the device 1 can be seen in FIG. 2. The device 1 has a vertically extending axis of symmetry 17, which is identical to the channel axis of symmetry. Valve body 8 and actuating pin 12 move in a core region of the device 1, in particular in a core element 18. It can be seen according to the sectional view of FIG. 1 that the core element 18 is arranged on multiple webs 29 on the wall 19 of the device 1. The essentially annular channel 6 thus resulting is formed from an upper channel section 20 in the upper docking segment 3 and a lower channel section 21 in the lower docking segment 5.

Figure 3A:
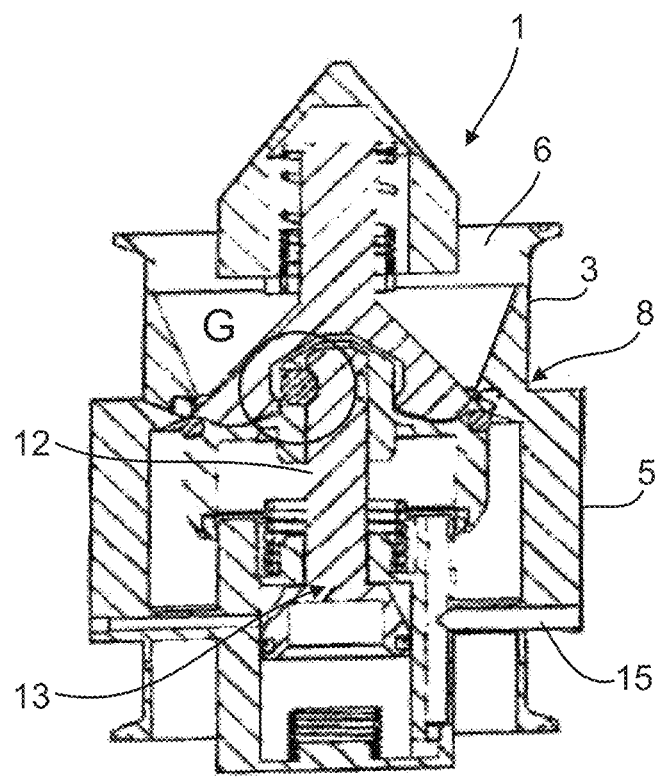

According to FIG. 3A, which shows a lateral sectional view of the device 1 according to FIGS. 1 and 2, the docking segments 3, 5 of the device 1 are arranged one inside the other or one on top of the other. This takes place by way of a form fit, i.e. the shape of the lower docking region 23 of the lower docking segment 5 fits closely in the corresponding recess of the upper docking region 24 of the upper docking segment 3. The arrangement according to FIG. 3A is achieved in that the upper container module having the upper docking segment 3 arranged thereon is placed on the lower container module having the lower docking segment 5 arranged thereon. Due to the form fit, a skewed or faulty placement of the one module on the other module is very improbable, whereby the handling capability the module connection is significantly simplified while simultaneously improving the reliability of the handling capability.

This is true all the more because opening of the channel by displacing the valve body into the open valve body position is only possible when the locking is completed mechanically correctly. Without locking, the blocking means remains in its starting position and a further displacement of the actuating pin and thus a movement of the valve body is not possible, since the blocking means, outside the blocking position, blocks a movement of the actuating pin together with the valve body. The blocking means is thus not only used for locking the docking segments but rather also so that a movement of the valve body does not occur if correct locking of the docking segments is absent. The actuating pin can still move (downward) in the event of faulty docking, but the movement is not transferred to the valve body because of a lack of blocking engagement of the blocking means. In principle, the passive docking segment, i.e. the docking segment in which the actuating assembly is not arranged, forms a type of "key" for the active docking segment, i.e. for the docking segment having actuating assembly. Without "key", i.e. without correctly docked passive docking segment, the valve body cannot be moved out of the closed position. This "failsafe" property of the docking device or valve device provides a significant improvement of the bulk good handling system, in particular with regard to safety aspects. This type of safe handling is always desired if a safety risk originates from the bulk material or container content. This can be the case with hazardous materials or with those materials which can be the cause of a health risk. Powders are to be mentioned as an example, which can be harmful to the skin or the respiratory tract, or those materials which chemically react with the environment, such as inflammable materials.

Figure 3B:
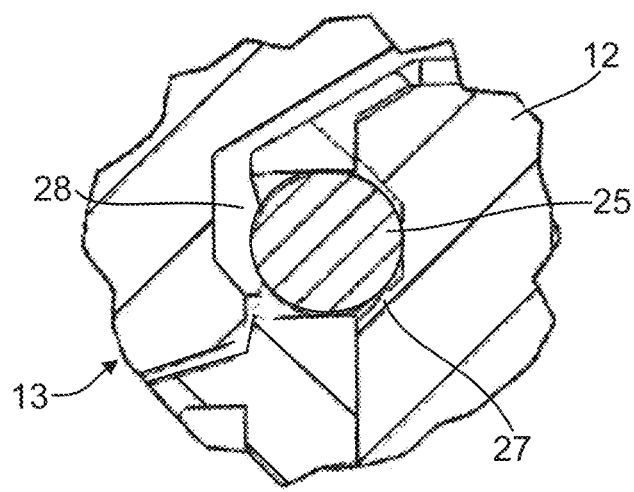

FIG. 3B shows a detail of FIG. 3A. According to the arrangement of FIGS. 3A/B, the blocking means 25 of the blocking assembly 26 is in a neutral, i.e. not blocking or not locking position. The blocking means 25 is formed as a sphere. It can be provided that the blocking assembly 26 comprises one blocking means 25 or multiple blocking means 25. The blocking means 25 can be uniformly distributed around the circumference of the actuating pin 12 in which they are arranged.

Figure 4A:
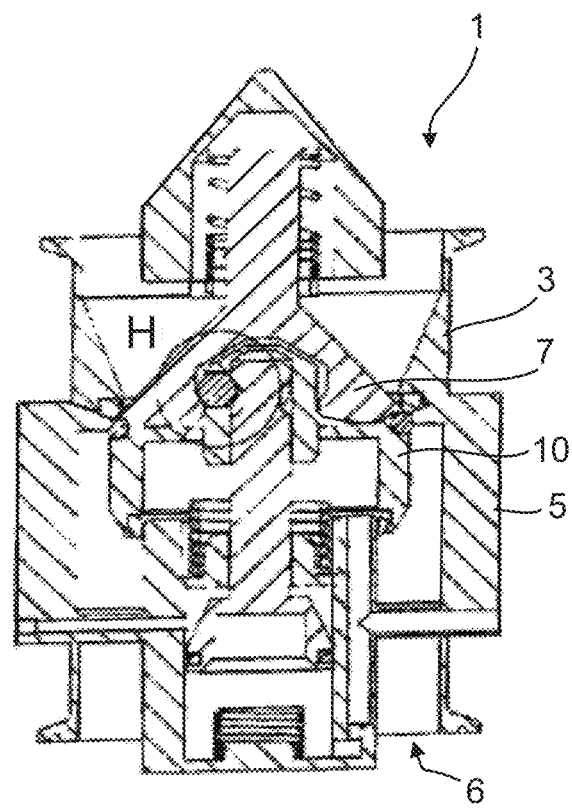
Figure 4B:
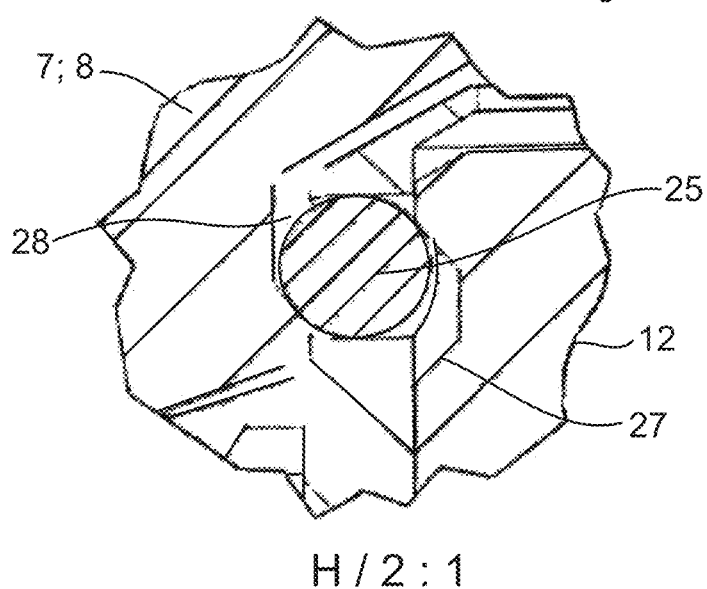
Figure 5:
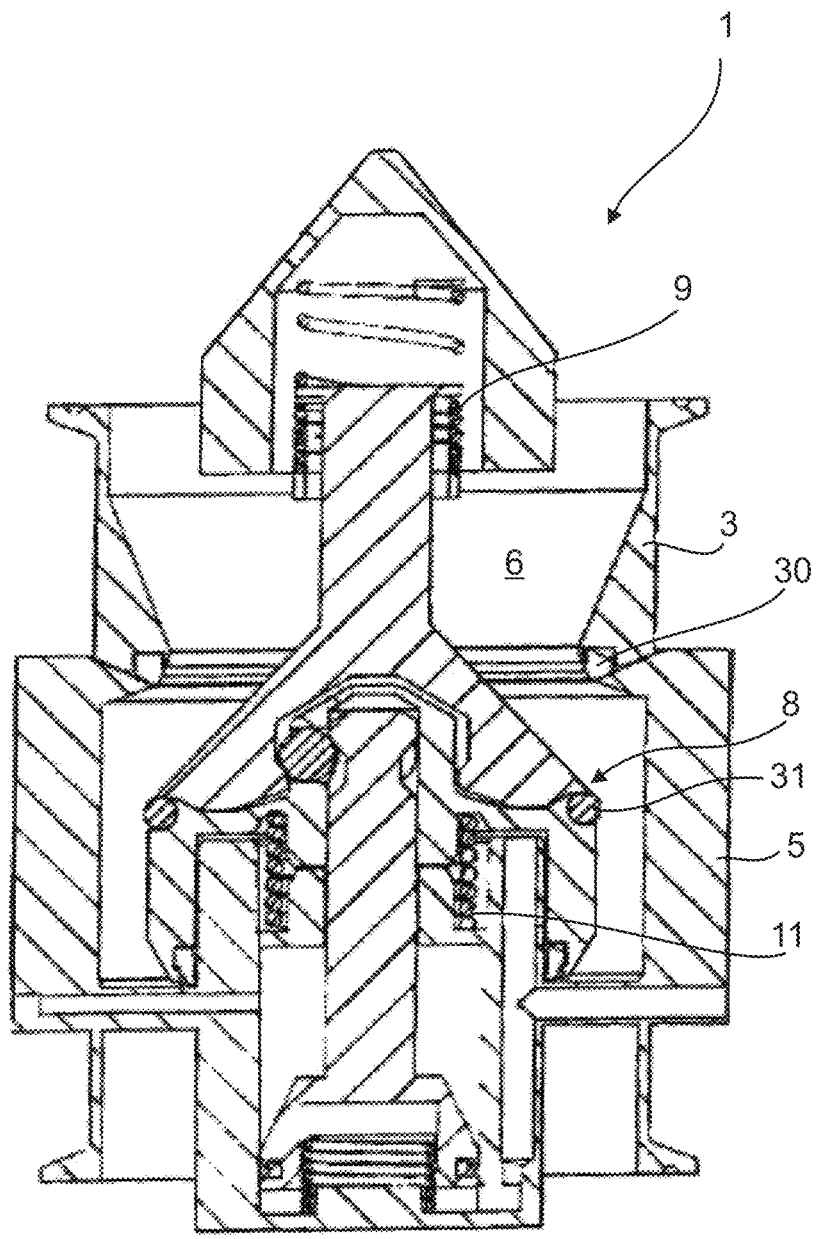
Figure 6:
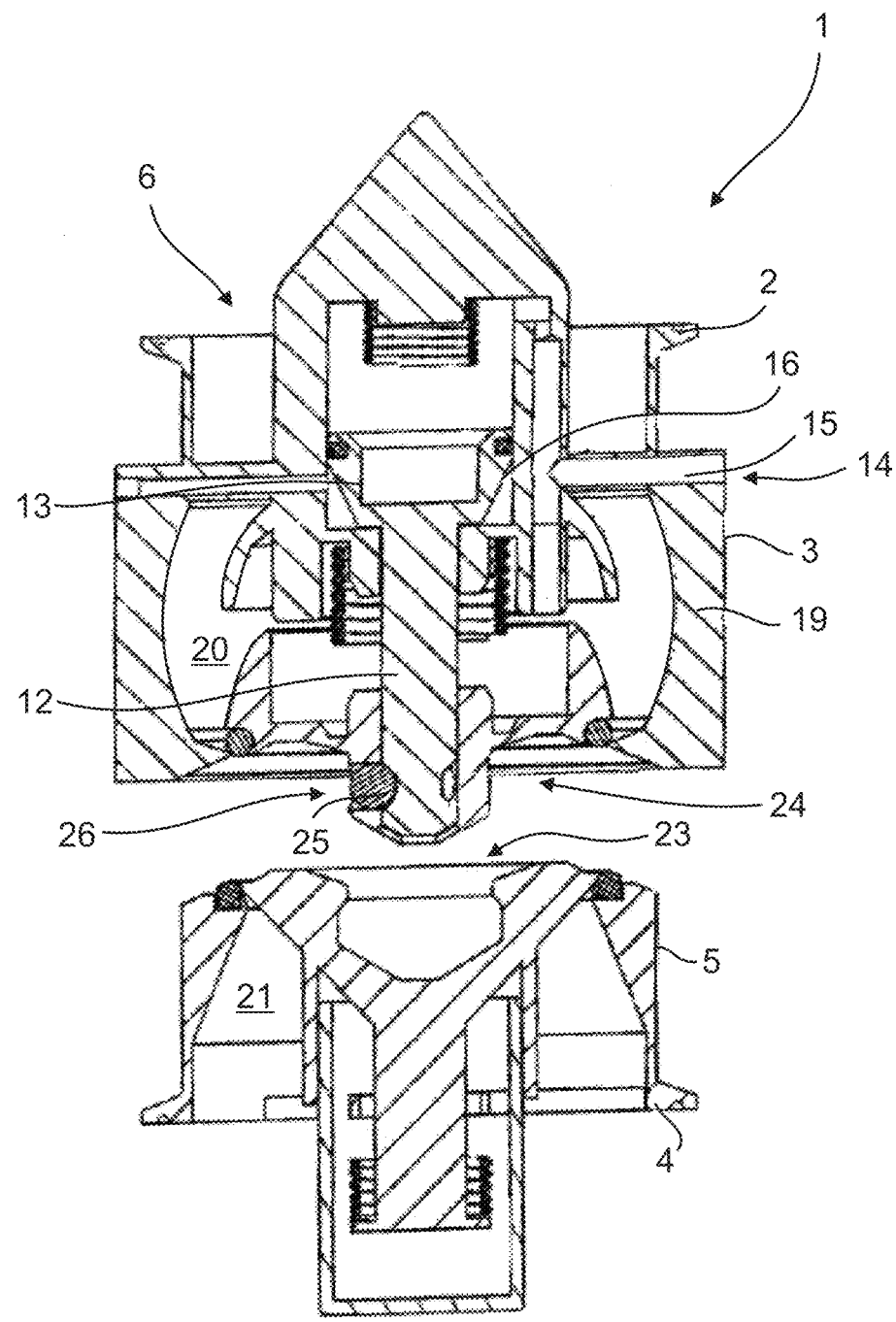
FIG. 6-10 show a variant of a docking device or valve device, respectively, in various views.
Figure 7:
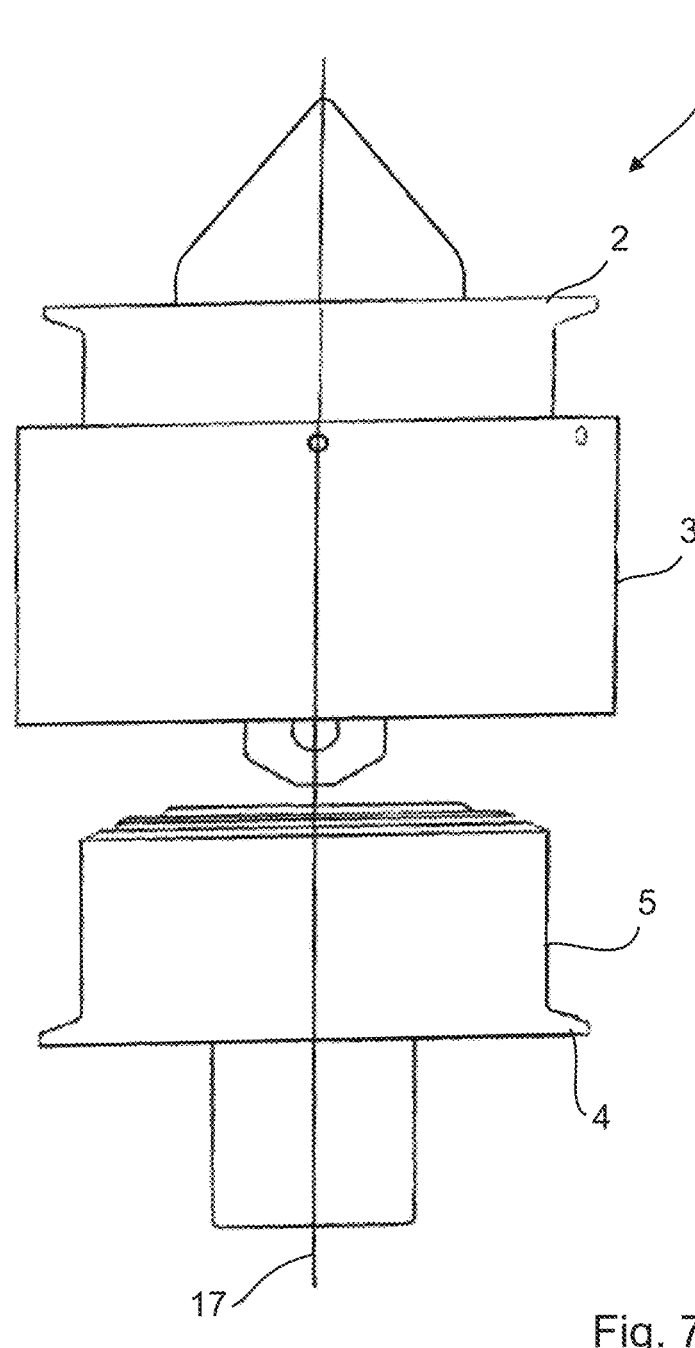
Figure 8A:
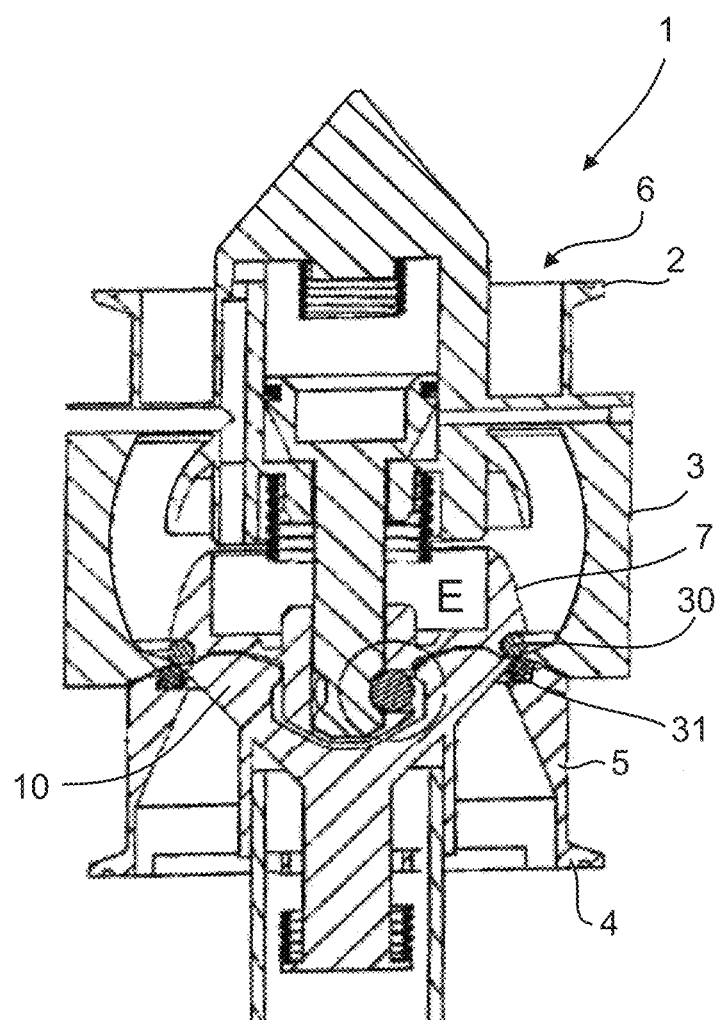
Figure 8B:
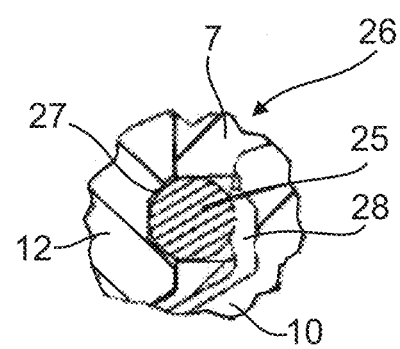
Figure 9A:
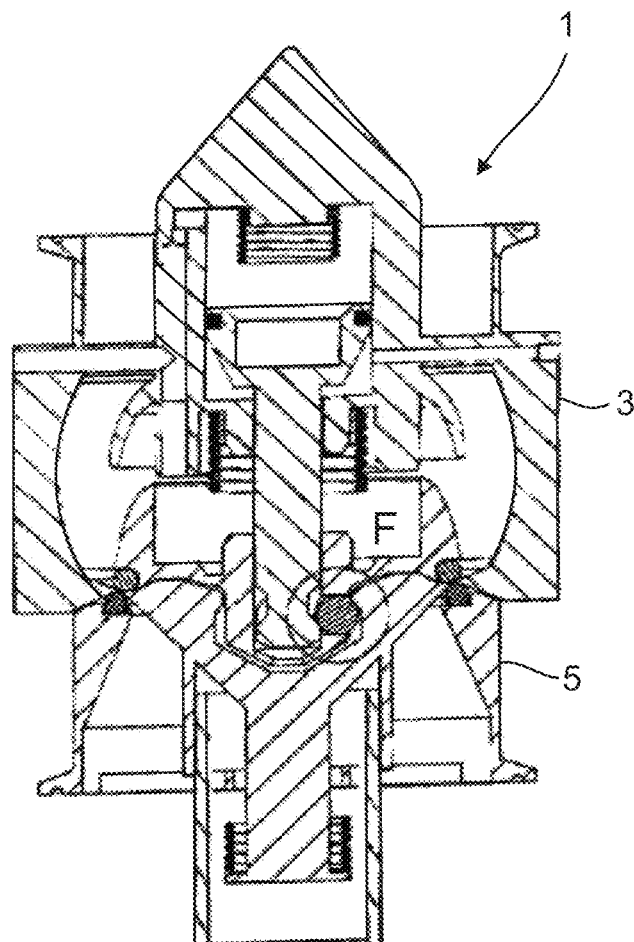
Figure 9B:
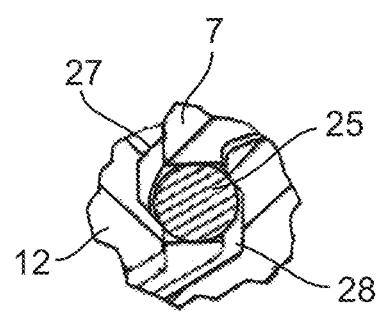

In that the actuating pin 12 of the actuating assembly 13 is moved downward in the axial direction, a first inclined surface 27 presses against the spherical blocking means 25. The axial movement of the actuating pin 12 is thus translated into a radial movement of the blocking means 25. The blocking means 25 accordingly moves into the blocking recess 28, which is arranged in the upper docking segment 3, namely there in the upper valve body part 7. FIGS. 4A/B show this, wherein FIG. 4B shows a detail of FIG. 4A. Upper docking segment 3 and lower docking segment 5 are mechanically coupled to one another in that the blocking means 25 is moved into the blocking recess 28. The device 1 is locked, so that upper segment 3 and lower segment 5 can no longer be moved away from one another. The locking can only be released by reversing the movement direction of the actuating pin 12.

According to the sectional view of FIG. 5A, the actuating pin 12 was moved further downward, whereby the valve body 8 is moved into an open valve body position. The upper valve body part 7 is mechanically engaged with the actuating pin 12 in the blocking position because of the blocking means 25, so that upon movement of the actuating pin 12, the upper valve body part 7 is also moved. This takes place against the action of the upper valve body spring 9. In that the upper valve body part 7 is moved downward together with the actuating pin 12, the lower valve body part 10 is also moved, since it presses against the upper valve body part 7. The movement of the lower valve body part 10 takes place against the action of the lower valve body spring 11.

An upper seal 30 is provided in the upper docking region 24 and a lower seal 31 is provided in the lower region 23. In the closed valve body position, the upper seal 30 seals off the upper channel section 20 on the sealing surface of the upper valve body part 7. In the closed valve body position, the lower seal 31 seals off the lower channel section 21 in the region of the sealing surface of the lower valve body part 10. In the open valve body position, i.e. in the docked state, the docking regions 23, 24 are in contact so that the upper seal 30 and the lower seal 31 have contact. The sealing action of the upper (lower) seal 30 (31) is reinforced in the open valve body position by the action of the upper (lower) valve body spring 9 (10). In the docked state and in the open valve body position, the sealing action of the upper and lower seals 30, 31 is reinforced by the action of the blocking assembly 26 and/or the actuating assembly 13.

A consideration of FIGS. 1 to 5 together discloses the kinematics of the device components during the docking: After the docking segments 3, 5 are placed, the actuating assembly 13 is actuated, whereby the actuating pin 12 of the actuating assembly 13 executes a vertical movement. According to a first movement section, this vertical movement is translated into a radial movement of a blocking means 25, whereby upper and lower docking segment 3, 5 are locked. During the first movement section of the actuating pin 12, the valve body 8 is in the closed valve body position. According to a second movement section of the vertical movement of the actuating pin 12 following thereon, the valve body 8 is moved from a closed into an open valve body position, whereby the channel 6 becomes open for the bulk material.

An interruption of the bulk material flow through the channel 6 can be achieved in that the valve body 8 is moved into its closed valve body position using the actuating assembly 13. This is achieved by directional reversal of the second movement section of the movement of the actuating pin 12.

If the segments 3, 5 are to be undocked again, for example to replace the upper (emptied) container module with a (full) container module, or for the purpose of changing the bulk material, the first movement section of the movement of the actuating pin 12 would also be reversed, i.e. the actuating pin 12 is moved back into the position shown according to FIG. 3A. The segments 3, 5 would then no longer be locked and could be decoupled from one another.

A variant of the device 1 according to FIGS. 1 to 5 is shown in FIGS. 6 to 10. With reference to the sectional view according to FIG. 6, conical or nearly conical valve body parts 7, 10 are located in each of the lower docking segment 5 and the upper docking segment 3. The movement direction of the actuating pin 12 according to the device variant shown in FIGS. 6 to 10 is identical during docking to the movement direction according to the device variant shown in FIGS. 1 to 5: During the docking, locking, and subsequent opening of the channel, the actuating pin 12 is moved vertically downward.

Figure 10:
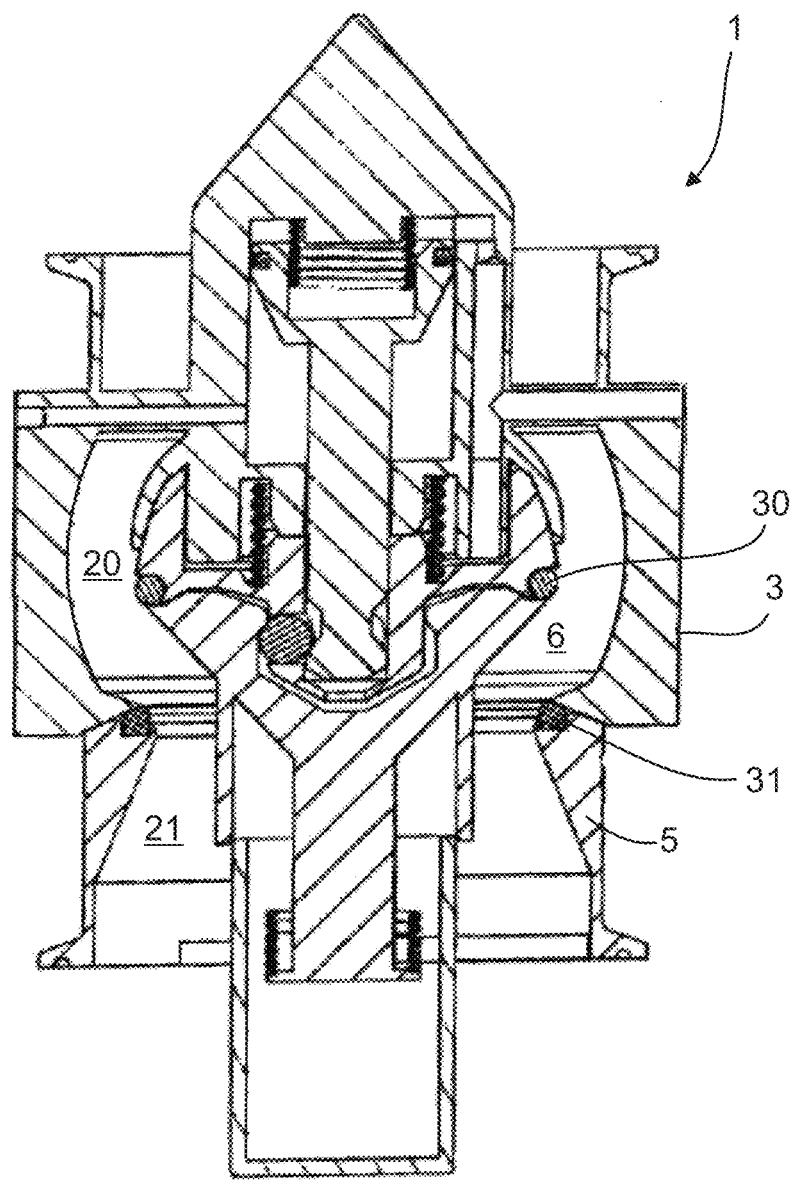

In contrast to the variant according to FIGS. 1 to 5, in the variant shown in FIGS. 6 to 10, the actuating pin 12 is arranged in the upper docking segment 3. The lower docking segment 5 occupies less structural space due to this construction, which is advantageous with some container variants (see FIG. 7). Furthermore, by way of the variant according to FIGS. 6 to 10, the active docking segment, i.e. the more complexly constructed and thus more costly segment, is fastened on the filling side of the container assembly, i.e. on the side on which, for example, a (vacuum) conveyor device is provided. The passive segment (segment without actuating assembly) is generally fastened on a container. Insofar as the device according to FIGS. 1 to 5 would preferably be used during container emptying, the variant according to FIGS. 6 to 10 would preferably be used during container filling. The docking, locking, and opening kinematics can be inferred from a consideration of FIGS. 6 to 10 together. Firstly, the spatially separated (FIG. 6) docking segments 3, 5 are arranged one on top of another (FIGS. 8A/B). In a first movement section, the blocking means 25 arranged in the upper docking segment 3 is moved into the blocking recess 28 in the lower docking segment 5 by the vertical movement of the actuating pin 12, whereby the segments 2, 5 are locked (FIGS. 9A/B). In a further movement section, the multipart valve body 8 is moved into the open valve body position (FIG. 10). The undocking takes place according to the steps in reverse sequence: change valve body position, FIG. 10, change blocking means engagement, FIGS. 9A/B, release the locking, FIGS. 8A/B, and separate the docking segments 3, 5, FIG. 6.

Figure 11:
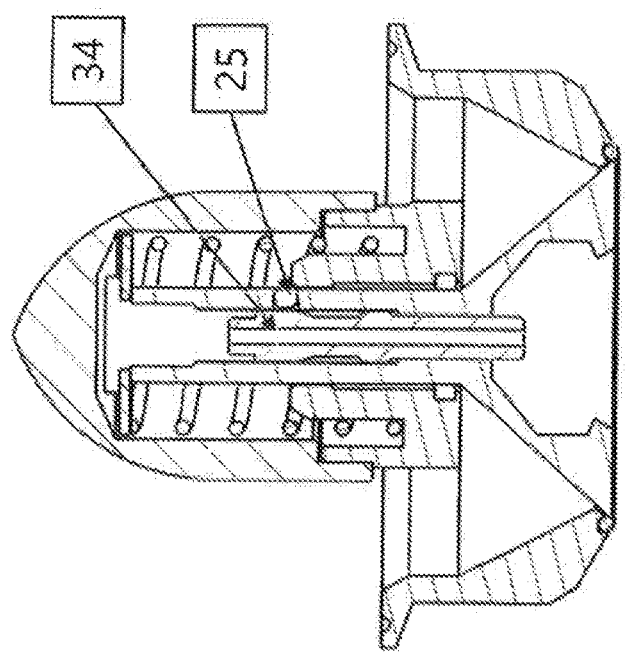
FIG. 11 shows a variant of a docking device or valve device, respectively, in a lateral sectional view.

FIG. 11 shows a lateral sectional view of a variant of a docking and/or valve device described herein. A mechanical securing element or a mechanical (auxiliary) lock is provided in the center of the device. According to the variant shown in FIG. 11, the mechanical lock is capable of keeping the passive docking element closed as long as the (securing) pin 34 remains in the lower position. It can alternatively be provided (not shown in the figures) that the securing pin is arranged in the active docking element. The pin 34 is movable, for example from outside the device, so that the valve securing is activated or deactivated. The (mechanical) lock ensures that fluid cannot inadvertently escape from the container module even in the separated state. The securing element according to FIG. 11 has a closing or key function, in particular for the upper container module.

Figure 12:
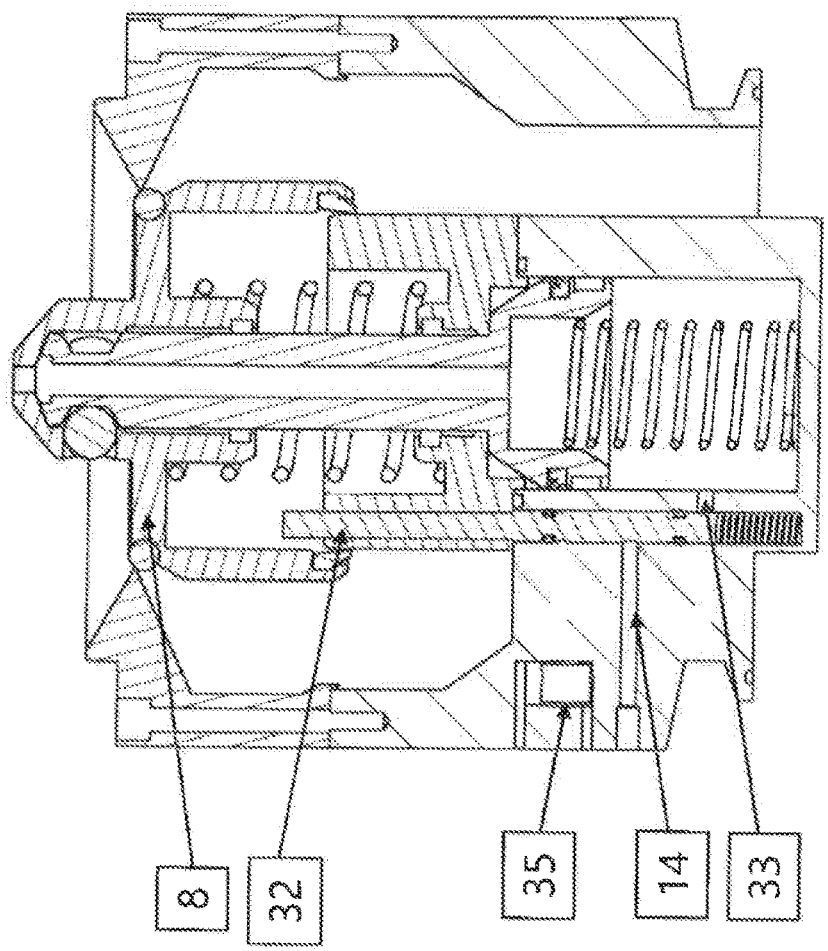
FIG. 12 shows a further variant of a docking device or valve device, respectively, in a lateral sectional view.

FIG. 12 shows a device variant, in which furthermore a mechanical or mechanical-pneumatic end location query is taken into consideration. Upon reaching an end location, i.e. in an intended "docked" component position, an overflow channel 33 is released. In this way, an (over) pressure is applied to the overflow channel 33, namely when the piston is in the lower position ("open"). The lower cone (valve body 8) only moves when the device 1 is in the correctly docked position. Accordingly, the pin 32 is only then actuated and only then can a signal, which is pneumatic in particular, result. This signal can be queried (in a way known per se) by a pressure switch, for example. Alternatively to this end location query concept, electrical, electromagnetic, electro-optical, or alternative concepts can be taken into consideration, which are not shown in FIG. 12.

Furthermore, a vibration device comprising a vibration means 35 for applying at least one oscillation, which is in particular mechanical and is at least partially transferable to the fluid, to at least one component of the device, can be seen in FIG. 12. The vibration means formed as an oscillation driver 35 furthermore applies a mechanical vibration to at least one of the valve body parts (7, 10) according to FIG. 12. This can be linear, transverse, longitudinal, and/or of another type, for example having circular components. The generated oscillation excitation transferred to the fluid is transferred to fluid bridges and/or fluid clumps or comparable (generally undesired fluid formations) and causes the formations to break up and thus a fluid congestion to be avoided.

LIST OF REFERENCE NUMERALS 1 docking device/valve device
2 upper connecting means (flange)
3 upper docking segment
4 lower connecting means (flange)
5 lower docking segment
6 channel
7 upper valve body part
8 valve body
9 upper valve body spring
10 lower valve body part
11 lower valve body spring
12 actuating pin
13 actuating assembly
14 attachment means
15 line
16 action surface
17 (channel) axis of symmetry
18 core element
19 wall
20 upper channel section
21 lower channel section
22 restoring spring
23 lower docking region
24 upper docking region
25 blocking means
26 blocking assembly
27 (first) inclined surface
28 blocking recess
29 web
30 upper seal
31 lower seal
32 pin
33 overflow channel
34 securing pin
35 vibration driver

The invention claimed is:

1. A docking device for mechanically connecting, namely for docking and undocking, an upper container module of a multipart container for a fluid and a lower container module of the multipart container, wherein
the docking device comprises an upper docking segment, which is fastenable using an upper connecting means on an opening of the upper container module, and a lower docking segment, which is fastenable using a lower connecting means on an opening of the lower container module,
the fluid then moves due to gravity and/or due to pressure from the upper container module through a channel of the docking device into the lower container module, or moves due to buoyancy and/or due to pressure from the lower into the upper container module, if at least one valve body, which is movable by means of an actuating assembly arranged in the upper and/or in the lower docking element in the channel of the docking device is in an open valve body position, an upper channel section is arranged in the upper docking segment and a lower channel section is arranged in the lower docking segment, an upper docking region of the upper channel section and/or the upper docking segment and a lower docking region of the lower channel section and/or the lower docking segment can be arranged one inside the other and/or one on top of another in such a way that the fluid flows through an externally leak-tight channel in the open valve body position, and an actuating assembly is arranged in the upper channel section and/or in the lower channel section, using which the valve body is actuatable so that it is movable from an open valve body position into a closed valve body position or from a closed valve body position into an open valve body position, characterized in that the actuating assembly comprises at least one blocking assembly comprising at least one blocking means, wherein upper and lower docking segment are stably connectable with one another in that the blocking means is moved into a blocking position, wherein during the docking process, upon actuation of the actuating assembly, firstly the blocking means is actuatable and subsequently the valve body, and during the undocking process, upon actuation of the actuating assembly, firstly the valve body is actuatable and subsequently the blocking means.

2. A docking device for interrupting a flow of a fluid having an upper and a lower docking segment for docking and undocking an upper container module of a multipart container for a fluid and a lower container module of the multipart container, wherein the upper docking segment is fastenable using an upper connecting means on an opening of the upper container module, and the lower docking segment is fastenable using a lower connecting means on an opening of the lower container module, the fluid then moves due to gravity and/or due to pressure from the upper container module through a channel of the docking device into the lower container module, or moves due to buoyancy and/or due to pressure from the lower into the upper container module, if at least one valve body, which is movable by means of an actuating assembly arranged in the upper and/or in the lower docking element, in the channel of the device is in an open valve body position, an upper channel section is arranged in the upper docking segment and a lower channel section is arranged in the lower docking segment, an upper docking region of the upper channel section and/or the upper docking segment and a lower docking region of the lower channel section and/or the lower docking segment can be arranged one inside the other and/or one on top of another, in such a way that the fluid flows through an externally leak-tight channel in the open valve body position, and an actuating assembly is arranged in the upper channel section and/or in the lower channel section, using which the valve body is actuatable so that it is movable from an open valve body position into a closed valve body position or from a closed valve body position into an open valve body position, characterized in that the actuating assembly comprises at least one blocking assembly comprising at least one blocking means, wherein upper and lower docking segment are stably connectable with one another in that the blocking means is moved into a blocking position, wherein during the docking process, upon actuation of the actuating assembly, firstly the blocking means is actuatable and subsequently the valve body, and during the undocking process, upon actuation of the actuating assembly, firstly the valve body is actuatable and subsequently the blocking means.

3. The docking device as claimed in claim 1, characterized in that the channel has a circular cross section, wherein a circle symmetry and/or a ring symmetry of the channel comprises a channel axis of symmetry.

4. The docking device as claimed in claim 2, characterized by a core element arranged in the channel along a channel axis of symmetry, in which the actuating assembly and/or the blocking assembly is at least partially movable.

5. The docking device as claimed in claim 2, characterized in that an actuating pin of the actuating assembly is movable in parallel to or along a channel axis of symmetry, and in that the blocking means of the blocking assembly is movable in the radial direction, wherein the actuating assembly comprises an actuating pin for manipulating the valve body, which comprises a first inclined surface, against which the blocking means of the blocking assembly presses, so that upon an axial movement of the actuating pin, the blocking means is movable with a radial directional component.

6. The docking device as claimed in claim 2, characterized in that the at least one blocking means is formed as a sphere or as a barrel or as a wedge or as a pin, and in that the blocking means is movable into a blocking recess during the docking, wherein the blocking means is arranged in the lower docking segment and the blocking recess is arranged in upper docking segment, or the blocking means is arranged in the upper docking segment and the blocking recess is arranged in the lower docking segment.

7. The docking device as claimed in claim 2, characterized in that the valve body is conical at least in sections, and/or in that the valve body is a) movable out of the closed position into the open position against the action of at least one valve body spring, and/or b) formed in multiple parts.

8. The docking device as claimed in claim 2, characterized in that the upper docking segment and/or the lower docking segment comprises a segment sealing surface, which is in contact with at least one valve body sealing surface in the closed valve body position, wherein the segment sealing surface and the valve body sealing surface are annular, and/or wherein at least one seal element is arranged in or on the segment sealing surface and/or in or on the valve body sealing surface, and/or wherein at least one seal element has a sealing force applied to it to form a seal by the action of a valve body spring.

9. The docking device as claimed in claim 2, characterized in that at least one docking seal element is arranged in or on the upper docking region and/or in or on the lower docking region.

10. The docking device as claimed in claim 2, characterized in that a movement of the valve body into the open valve body position by the actuating assembly only takes place if the blocking means of the blocking assembly is in the blocking position, wherein the actuating assembly is actuatable mechanically, hydraulically, and/or pneumatically.

11. The docking device as claimed in claim 2, characterized in that the actuating assembly and/or an actuating pin comprises an action surface, which is inclined and/or conical and via which a force and/or a torque is transferable to the actuating assembly and/or the actuating pin.

12. The docking device as claimed in claim 2, characterized in that the actuating assembly and/or an actuating pin is actuatable against the action of a restoring spring and/or in that the actuating assembly is actuatable magnetically.

13. The docking device as claimed in claim 2, characterized in that the valve body is formed in two parts, wherein an upper valve body part is arranged in the upper docking segment and a lower valve body part is arranged in the lower docking segment.

14. The docking device as claimed in claim 2, characterized in that a securing element, which is movable and is arranged in or on the upper and/or lower docking element, whereby the docking elements of the device can be mechanically secured against opening in the respective closed valve body position.

15. The docking device as claimed in claim 2, characterized in that a position or location detection means is arranged on the upper and/or lower docking element, whereby the position or location of the upper/lower docking element in relation to the lower/upper docking element is detectable, mechanically, pneumatically, electrically, electronically, electromagnetically, and/or electro-optically.

16. The docking device as claimed in claim 2, characterized in that at least one pressure-compensating means is provided, using which a partial or complete pressure compensation can be produced between upper container module and lower container module during and/or after a fluid movement, wherein the pressure-compensating means is formed as a channel between upper and lower channel section.

17. The docking device as claimed in claim 2, characterized in that the device comprises at least one surge-gassing means and/or pressure-gassing means, using which a gas flow can be applied to at least one device component to clean the component against which flow occurs.

18. The docking device as claimed in claim 2, characterized in that at least one vibration means is arranged in or on the upper and/or lower valve body part, whereby at least a vibration can be applied to the upper and/or lower valve body part.

19. A device for metering the flow of a fluid from an upper container module of a container into a lower container module of the container or from a lower container module into an upper container module, characterized by the docking device as claimed in claim 2, wherein a control and/or regulating assembly controls and/or regulates the valve body position.

20. The device as claimed in claim 19, characterized in that a vibration device comprising at least one vibration means is provided for applying at least a vibration, which is at least partially transferable to the fluid, to at least one component of the device.

21. A container for a fluid comprising at least one container module, characterized in that upper and/or lower container module are connected using the docking device as claimed in claim 2.

22. A docking device for mechanically connecting an upper container module of a container to a lower container module of said container to control a flow of a fluid between said upper container module and said lower container module; said docking device comprising:
an upper docking segment; said upper docking segment includes an upper flange, an upper valve part and an upper fluid passageway; said upper flange is configured to releasably connect said upper container module to said upper docking segment to enable fluid flow between said upper docking segment and said upper container module; said upper valve part is movable between an upper and lower position; said upper valve part is biased in said upper position; a lower portion of said upper valve part includes a lower engagement region;
a lower docking segment; said lower docking segment includes a lower flange, a lower valve part and a lower fluid passageway; said lower flange is configured to releasably connect said lower container module to said lower docking segment to enable fluid flow between said lower docking segment and said lower container module; said lower valve part is movable between an upper and lower position; said upper valve part is biased in said upper position; an upper portion of said lower valve part includes an lower engagement region; said lower engagement region is configured to engage said upper engagement region of said upper valve part when said upper and lower docking segments are releasably connected together;
a blocking pin that is positioned in said upper and/or lower engagement region when said upper and lower docking segments are releasably connected together; said blocking pin is configured to move between a block and unblock position; said blocking pin is movable to a block position that blocks fluid flow through said upper and/or lower fluid passageways when a) said lower flange is not releasably connected said lower container module, b) said upper flange is not releasably connected said upper container module, and/or c) said upper and lower docking segments are not properly releasably connected together; said blocking pin is movable to an unblocked position that allows fluid flow through said upper and lower fluid passageways via said upper and lower engagement regions when i) said lower flange is releasably connected said lower container module, ii) said upper flange is releasably connected to said upper container module, and iii) said upper and lower docking segments are properly releasably connected together.

23. The docking device as defined in claim 22, wherein a channel exist between said upper docking segment and said lower docking segment; said channel has a circular cross section, and wherein a circle symmetry and/or a ring symmetry of said channel has a channel axis of symmetry.

24. The docking device as defined in claim 23, wherein a core element is arranged in said channel along said channel axis of symmetry; said actuating assembly and/or said blocking assembly is at least partially movable.

25. The docking device as defined in claim 23, wherein an actuating pin of said actuating assembly is movable in a direction that is parallel to or along said channel axis of symmetry.

26. The docking device as defined in claim 22, wherein at least one docking seal element is arranged in or on said upper docking region and/or in or on said lower docking region.

27. The docking device as defined in claim 22, wherein a position or a location detection arrangement is arranged on said upper docking segment and/or said lower docking segment; a position or a location of said upper docking segment in relation to said lower docking segment and/or a position or a location of said lower docking segment in relation to said upper docking segment is detectable.

\* \* \* \* \*